UNITED STATES PATENT OFFICE.

FRANCIS M. ROGERS, OF WHITING, INDIANA, ASSIGNOR TO STANDARD OIL COMPANY, OF WHITING, INDIANA, A CORPORATION OF INDIANA.

TREATMENT OF EMULSION-OILS.

1,299,385.  Specification of Letters Patent.  Patented Apr. 1, 1919.

No Drawing.   Application filed January 26, 1918.  Serial No. 214,013.

*To all whom it may concern:*

Be it known that I, FRANCIS M. ROGERS, a citizen of the United States, residing at Whiting, in the county of Lake and State of Indiana, have invented a new and useful Treatment of Emulsion-Oils, of which the following is a specification.

My invention relates to the treatment of emulsions of mineral oil and water and will be fully understood from the following specification.

I have discovered that it is possible to break down practically all of the emulsions commonly encountered in the petroleum industry by the use of a reagent comprising a water-soluble salt of sulfonic acid. Sulfonic acids suitable for this use are now produced in considerable quantities in the treatment of high viscosity oils with fuming sulfuric acid to produce lubricants of the best grade, and also in the production of the highly refined oils used for medicinal purposes. I prefer to employ the sodium salt of such a sulfonic acid, which may be obtained by the direct neutralization of the acid with commercial sodium carbonate (normal).

In treating an oil emulsion according to my invention the same is mixed with from ¼ to four pounds (per barrel of emulsion) of the sodium sulfonate referred to above, the sulfonate being conveniently introduced in the form of a 25% aqueous solution giving about ¼ to four per cent. (by volume) of the solution with reference to the emulsion. The emulsion to which the sodium sulfonate has been added is heated to a moderately high temperature, for example, 150° F., and maintained at this temperature until the stratification has taken place. The quantity of sodium sulfonate required, the temperature of the treatment, and the length of time required for stratification or breaking of the emulsion are all factors which vary with the characteristics of the particular emulsion under treatment. As a specific example, the following may be given. An emulsion of the character known as "bottom settlings" from mid-continent crude petroleum and containing approximately fifty per cent. of water, together with a large proportion of earthy and organic sediment, has added thereto two per cent. (by volume) of a 25 per cent. solution of sodium sulfonate, produced by the neutralization with sodium carbonate of the sulfonic acid obtained by sulfonating mineral oil. The temperature is raised to 150° F. and maintained at this point for a period of one hour, at the end of which time the "bottom settlings" or emulsion is found to be perfectly stratified into an upper layer substantially free of water and dirt and a lower layer substantially free of oil.

The reagent of my invention is regarded as superior to the reagents heretofore suggested for this purpose in that it is relatively cheap, and is so powerful as to be effective in relatively small proportions and is more uniformly successful on all varieties of emulsions, giving a maximum oil recovery at a minimum expense for treatment.

It should be noted that it is unnecessary to employ a pure sulfonate, the oil, water and sulfuric acid or salt thereof which may be present doing no harm.

While I have referred to the product employed by me for breaking emulsions as a reagent, it should not be inferred that I attribute the effect obtained to any chemical activity. On the contrary, I believe that it is more likely that the breaking of the emulsion is due to the change in the surface tension of the liquid effected by the addition of the sulfonate. It should be understood, however, that my invention is not based upon nor dependent upon the theory which I have expressed. Nor is the invention to be regarded as limited to the express procedure or materials mentioned in the foregoing, these details being given only by way of illustration and to aid in making the invention more clear, and I do not regard such specific details as essential to the invention except in so far as they are expressed by way of limitation in the appended claims, in which it is my intention to claim all novelty inherent in the invention as broadly as is permissible in view of the prior art.

What I regard as new and desire to secure by Letters Patent is:

1. The method of treating emulsions of mineral oil and water which consists in adding thereto a water-soluble salt of sulfonic acid and maintaining the mixture at an elevated temperature until stratification takes place.

2. The method of treating emulsions of mineral oil and water which consists in adding thereto an alkali metal salt of sulfonic acid and maintaining the mixture at an elevated temperature until stratification takes place.

3. The method of treating emulsions of mineral oil and water which consists in adding thereto the sodium salt of a sulfonic acid and maintaining the mixture at an elevated temperature until stratification takes place.

4. The method of treating emulsions of mineral oil and water which consists in adding thereto the water-soluble salt of sulfonic acid produced by the sulfonation of mineral oil and maintaining the mixture at an elevated temperature until stratification takes place.

5. The method of treating emulsions of mineral oil and water which consists in adding thereto the alkali metal salt of a sulfonic acid produced by the sulphonation of mineral oil and maintaining the mixture at an elevated temperature until stratification takes place.

6. The method of treating emulsions of mineral oil and water which consists in adding thereto the sodium salt of a sulfonic acid produced by the sulfonation of mineral oil and maintaining the mixture at an elevated temperature until stratification takes place.

7. The method of treating bottom settlings which consists in adding thereto from ¼ to four pounds per barrel of the sodium salt of a sulfonated mineral oil, and maintaining the mixture at an elevated temperature until stratification takes place.

FRANCIS M. ROGERS.